Aug. 23, 1927.

K. O. NELSON ET AL 1,640,093

TWO-WAY VALVE

Filed Aug. 7, 1925

Inventors:
Karl O. Nelson
Henry G. Nannemacher

Patented Aug. 23, 1927.

1,640,093

UNITED STATES PATENT OFFICE.

KARL O. NELSON AND HENRY J. NUNNEMACHER, OF MILWAUKEE, WISCONSIN.

TWO-WAY VALVE.

Application filed August 7, 1925. Serial No. 48,790.

This invention relates to two-way valves.

In valves such as those employed for controlling compressed air, it has been found that the valves have to be frequently packed at short intervals when they are in continuous use. Further these valves do not always accurately seat after a short period of use, and particularly when they are reground, thus resulting in an unsatisfactory, leaky condition.

This invention is designed to overcome the above noted defects, and objects of such invention are to provide a packingless valve which will last for a great length of time without any attention whatsoever, which is so constructed that the valve itself is free from rigid connection with the operating spindle and is held flat against its seat by the air pressure and does not cause binding of the operating spindle, and to provide a valve which may be very cheaply constructed and readily assembled.

An embodiment of the invention is shown in the accompanying drawings, in which:—

Figure 1:
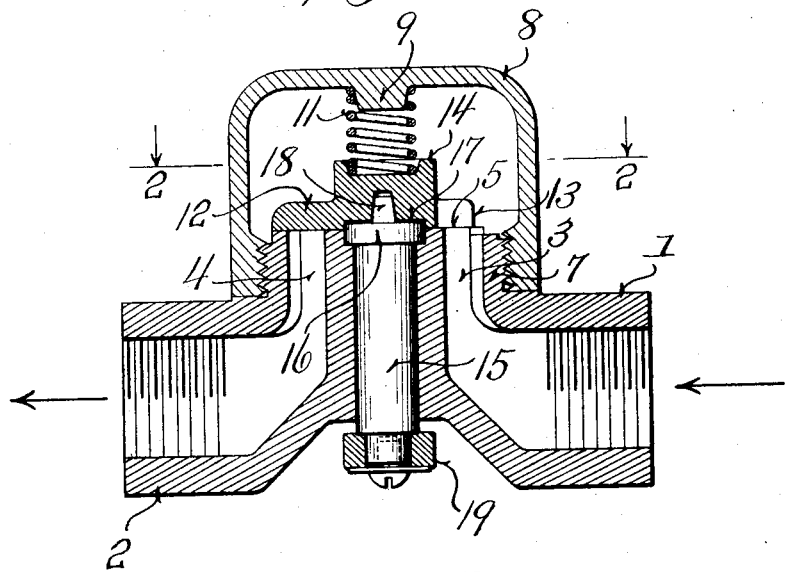
Figure 1 is a sectional view through the valve corresponding to the line 1—1 of Figure 2.
Figure 2:
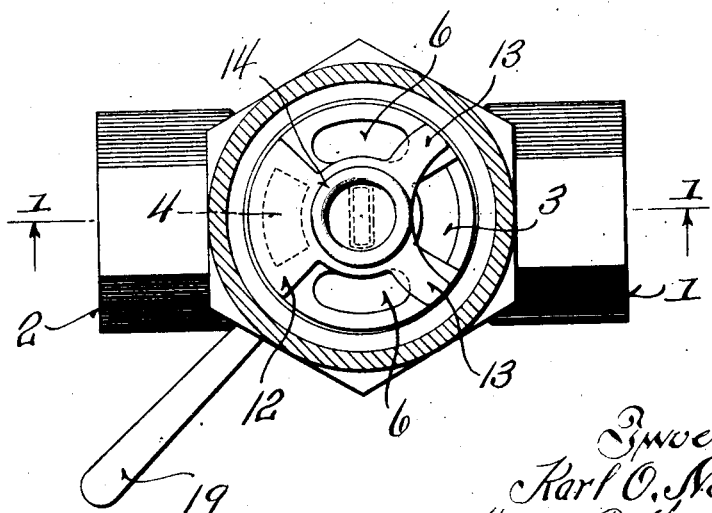
Figure 2 is a transverse sectional view on the line 2—2 of Figure 1.

Referring to the drawings, it will be seen that the valve comprises a main body portion having an inlet end 1 and an outlet end 2. This body portion is provided with an inlet duct 3 and an inlet duct 4 which open upwardly through the upper flat valve seat 5, as indicated in the drawings. If desired, this body portion may be lightened by means of apertures 6, as indicated in Figure 2, although these apertures play no part in the operation of the valve. This body portion is provided with a raised hub 7 which is externally threaded to receive the threaded portion of a cylindrical cap 8, as shown in Figure 1, such cap being provided preferably with a downwardly projecting lug 9 adapted to carry and temporarily retain a helical compression spring 11.

The valve proper is provided with a main portion 12 which, in the position shown in the drawings, closes the outlet duct 4. It is provided also with a pair of spaced bearing arms 13 in order to equalize the pressure and wear upon the valve seat. The valve is further provided with an upwardly extending circular flange 14 which receives the inner end of the spring.

An operating spindle 15 passes through the center of the body portion and is provided with an integral collar 16, seated in a socket in the body portion and projecting upwardly therefrom a slight distance. The upwardly projecting portion of this collar is loosely received within a cylindrical space 17 formed in the bottom portion of the valve proper or cut off member 12. The spindle is further provided with a blunt wedge-shaped projection 18 which is loosely received within a corresponding recess formed in the movable member of the valve. It is to be noted, however, that the fit between the spindle and the valve is very loose and allows the valve to freely seat itself under the influence of the fluid pressure.

The outer end of the spindle 15 is adapted to receive an operating handle 19 which may be secured thereto in any suitable manner.

In assembling this valve, it is merely necessary to slip the spindle into place and to, thereafter, secure the operating handle thereto. The valve 12 is now placed upon its seat with the wedge 18 of the spindle registering with the corresponding aperture in the valve.

The compression spring 11 is slipped upon the lug 9 of the cap 8 and is held thereon by friction during assembling. The cap 8 is then screwed in place thus positioning the lower end of the spring inside of the circular flange 14 of the valve proper.

In operating the valve rotary motion is transmitted from the spindle to the valve while at all times the valve is permitted to independently seat itself due to the action of the downwardly exerted pressure within the cap 8. This valve has been found to maintain an air tight seat for a remarkable length of time and also, as noted, is free from packing and consequently avoids the usual frequent expense of repacking.

While this valve is intended primarily as a compressed air control valve, it is nevertheless obvious that it may be used for other purposes. In an actual test run on this valve, it has been found that whereas the ordinary compressed air valves require repacking and regrinding at intervals of two weeks, a valve of this kind has been found to last a number of months without any attention whatsoever, and in fact the valve originally tested is in regular and uninterrupted use.

Although the invention has been described in considerable detail, it is to be understood that the invention may be variously embodied and is, therefore, to be limited only as claimed.

We claim:

A valve comprising a body portion having an entrance aperture and an outlet aperture and having upwardly extending entrance and outlet ducts opening through the upper face of the body portion, a valve adapted to rotate upon said upper face and having a flat enlarged portion on one side and a pair of bearing arms on the other side of lesser width than the entrance or outlet ducts, a valve spindle having an elongated bearing portion extending through the body of the valve and having a disc-like upper portion seated within a corresponding cavity formed in the body portion of the valve and projecting slightly above the upper face of the body portion, said valve having a similar recess for receiving the projecting portion of the disc-like part of the valve spindle, said valve spindle and valve having interengaging portions, whereby rotary motion may be imparted to said valve by said spindle, said body portion being externally threaded, a closure cap internally threaded and screwed upon the threaded part of the body portion, and a spring interposed between said cap and said valve, the entrance and outlet openings of said body portion being in alignment.

In testimony that we claim the foregoing we have hereunto set our hands at Milwaukee, in the county of Milwaukee and State of Wisconsin.

KARL O. NELSON.
HENRY J. NUNNEMACHER.